(12) United States Patent
Buburuzan et al.

(10) Patent No.: US 10,431,092 B2
(45) Date of Patent: Oct. 1, 2019

(54) METHOD FOR PERFORMING A COOPERATIVE DRIVING MANEUVER

(71) Applicant: VOLKSWAGEN AG, Wolfsburg (DE)

(72) Inventors: Teodor Buburuzan, Braunschweig (DE); Bernd Lehmann, Wolfsburg (DE); Bernd Rech, Bokensdorf (DE); Monique Engel, Braunschweig (DE); Sandra Kleinau, Rötgesbüttel (DE); Stefan Gläser, Braunschweig (DE); Hendrik-Jörn Günther, Hannover (DE); Johannes Hartog, Braunschweig (DE)

(73) Assignee: Volkswagen AG (DE)

( * ) Notice: Subject to any disclaimer, the term of this patent is extended or adjusted under 35 U.S.C. 154(b) by 211 days.

(21) Appl. No.: 15/604,751

(22) Filed: May 25, 2017

(65) Prior Publication Data

US 2017/0345308 A1  Nov. 30, 2017

(30) Foreign Application Priority Data

May 30, 2016  (DE) ........................ 10 2016 209 330

(51) Int. Cl.
*G06F 19/00* (2018.01)
*G06G 7/70* (2006.01)
(Continued)

(52) U.S. Cl.
CPC ............. *G08G 1/163* (2013.01); *B60W 30/08* (2013.01); *B60W 30/09* (2013.01);
(Continued)

(58) Field of Classification Search
CPC ....... G08G 1/163; G08G 1/161; B60W 30/08; B60W 30/09; B60W 30/0956; B60W 30/18154; B60W 30/0953; G05D 1/021
(Continued)

(56) References Cited

U.S. PATENT DOCUMENTS

2013/0325306 A1* 12/2013 Caveney ........... B60W 30/0953
701/117
2016/0107682 A1* 4/2016 Tan ........................ B62D 6/00
701/41

FOREIGN PATENT DOCUMENTS

DE  102006038018 A1  2/2008
DE  102007058538 A1  6/2009
(Continued)

*Primary Examiner* — Mahmoud S Ismail
(74) *Attorney, Agent, or Firm* — Barnes & Thornburg LLP

(57) ABSTRACT

A method for performing a cooperative driving maneuver and a vehicle. The method performs a cooperative driving maneuver which includes determining, by a first vehicle, a driving maneuver to be carried out; receiving maneuver information pertaining to a planned driving maneuver of a second vehicle by the first vehicle receiving surroundings information by the first vehicle, stipulating, by the first vehicle based on the received maneuver information and the received surroundings information, a maneuver trajectory for the driving maneuver to be carried out, and performing the driving maneuver by the first vehicle using the stipulated maneuver trajectory. Also disclosed is a way for vehicles to be better able to interpret received information pertaining to a planned driving maneuver of another vehicle to increase safety for the performance of a cooperative driving maneuver.

22 Claims, 2 Drawing Sheets

(51) Int. Cl.
*G06G 7/76* (2006.01)
*G08G 1/00* (2006.01)
*G08G 1/16* (2006.01)
*B60W 30/095* (2012.01)
*B60W 30/08* (2012.01)
*B60W 30/09* (2012.01)
*B60W 30/18* (2012.01)
*G05D 1/02* (2006.01)
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)
*G05D 7/00* (2006.01)
*G06F 17/00* (2019.01)

(52) U.S. Cl.
CPC .. *B60W 30/0956* (2013.01); *B60W 30/18154* (2013.01); *G05D 1/021* (2013.01); *G08G 1/161* (2013.01); *B60W 2550/10* (2013.01); *B60W 2550/30* (2013.01); *B60W 2550/408* (2013.01); *B60W 2750/40* (2013.01)

(58) Field of Classification Search
USPC .................................................. 701/117, 41
See application file for complete search history.

(56) References Cited

FOREIGN PATENT DOCUMENTS

| | | |
|---|---|---|
| DE | 102012008659 A1 | 11/2012 |
| DE | 102011080922 A1 | 2/2013 |
| DE | 102012011994 A1 | 12/2013 |
| DE | 102014201648 A1 | 7/2015 |
| DE | 102014205391 A1 | 9/2015 |
| KR | 20110094982 A | 8/2011 |
| WO | 9963502 A2 | 12/1999 |

\* cited by examiner

METHOD FOR PERFORMING A COOPERATIVE DRIVING MANEUVER

PRIORITY CLAIM

This patent application claims priority to German Patent Application No. 10 2016 209 330.4, filed 30 May 2016, the disclosure of which is incorporated herein by reference in its entirety.

SUMMARY

Illustrative embodiments relate to a method for forming a cooperative driving maneuver and to a vehicle.

BRIEF DESCRIPTION OF THE DRAWINGS

Disclosed embodiments are explained below with reference to the associated drawings, in which.

DETAILED DESCRIPTION

Figure 1:
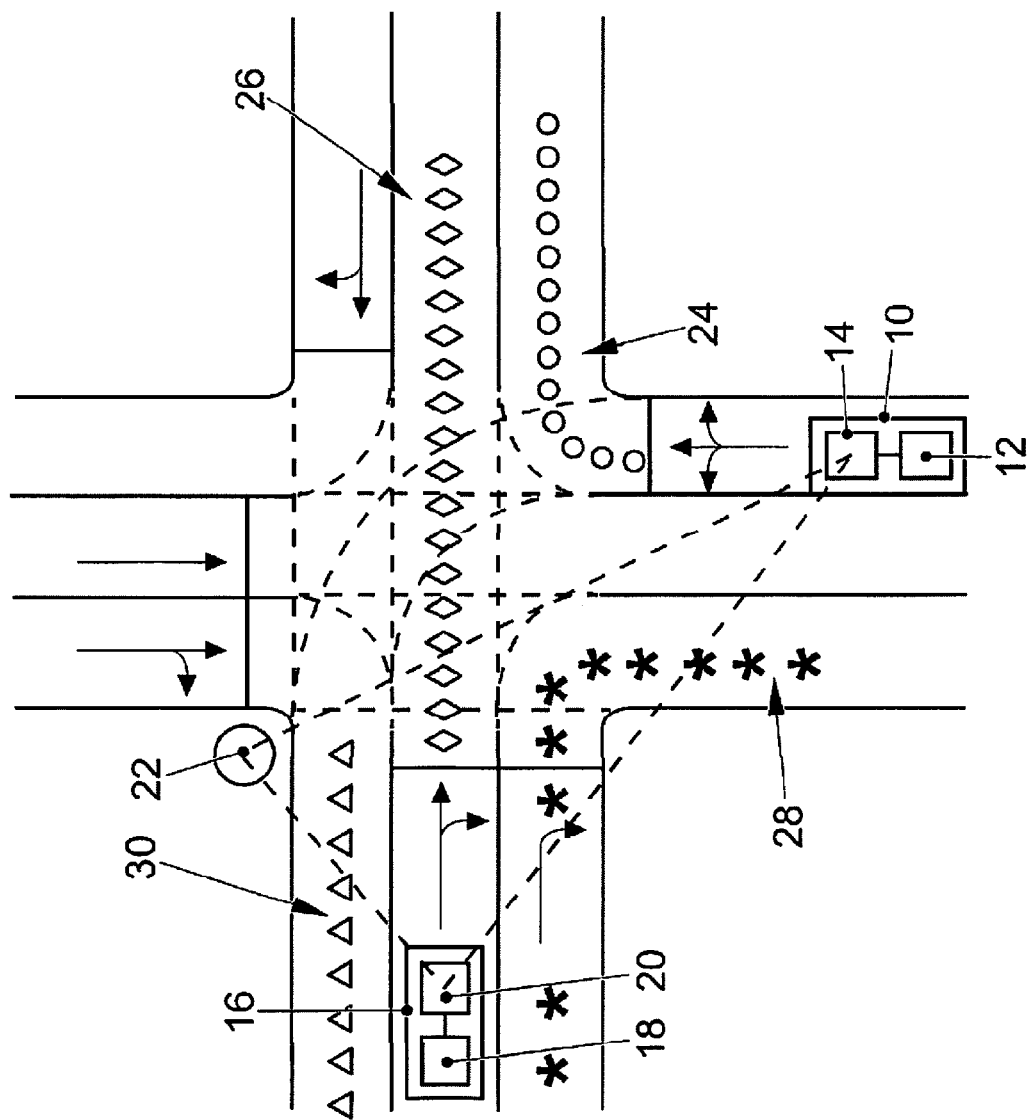
FIG. 1 shows a road junction with two disclosed vehicles in a schematic depiction.

Performance of a cooperative driving maneuver usually involves at least two vehicles, with at least one vehicle adapting its driving behavior in relation to another vehicle. Distance-regulating cruise controls that assist the vehicle driver in keeping a suitable distance from the vehicle in front have been used in the prior art for some time now. Such systems are known by the names adaptive cruise control (ACC) and automatic distance regulation (ADR), for example. These involve the distance from the vehicle in front being continuously monitored, with the ascertained distance being taken into consideration as a manipulated variable for adapting the vehicle speed.

Improving cooperative driving maneuvers requires the vehicles involved to communicate with one another, however. For this reason, vehicles will soon increasingly be equipped with communication systems or services. One type of service sets up a communication link between vehicles or from a vehicle to an infrastructure, such as a set of traffic lights, for example. Such designs are referred to as car-to-car systems, car-to-infrastructures systems or car-to-X systems, for example, the X being a wildcard for arbitrary infrastructure installations, other vehicles and other road users. Further standard names are Car2C, Car2X, C2C and C2X systems, vehicle-to-vehicle systems (V2V), vehicle-to-infrastructure systems (V2I) or vehicle-to-X systems (V2X).

This communication between vehicles or between vehicles and infrastructure is fundamentally also suitable for assisting cooperative driving maneuvers.

DE 10 2012 011 994 A1 proposes a corresponding method for cooperatively controlling a traffic situation with two vehicles. The two vehicles interchange information with one another, the interchanged information comprising details about the intended driving behavior of a first vehicle. On the basis of the details about the intended driving behavior of the first vehicle, the second vehicle adapts its driving behavior accordingly. The document proposes communicating the details about the intended driving behavior as a predictive trajectory.

Such and other solutions have the problem, however, that the communicated vehicle positions need to be extremely exact to keep down the risk of accident for the autonomous or semi-autonomous performance of a cooperative driving maneuver. Just slight positional discrepancies can result in an erroneous lane association, for example, which results in a substantial risk of accident for the performance of a cooperative driving maneuver.

The document DE 10 2014 201 648 A1 proposes in this regard a method for communication within a motor vehicle communication system, wherein an infrastructure installation is set up to transmit a control message to vehicles, the control message comprising topology information describing the traffic lanes in the surroundings of the infrastructure installation, so that a lane association can be made, for example. The proposed method is implementable only in the peripheral area of corresponding infrastructure installations, however.

Disclosed embodiments provide a way for vehicles to be better able to interpret received information pertaining to a planned driving maneuver of another vehicle, to increase safety for the performance of a cooperative driving maneuver.

In the disclosed method, a first vehicle determines a driving maneuver to be carried out and receives maneuver information pertaining to a planned driving maneuver of a second vehicle. In addition to the maneuver information pertaining to the planned driving maneuver of the second vehicle, the first vehicle receives surroundings information, so that it can stipulate a maneuver trajectory for the driving maneuver to be carried out on the basis of the received maneuver information and the received surroundings information. Following stipulation of the maneuver trajectory, the first vehicle then carries out the driving maneuver using the stipulated maneuver trajectory.

In the disclosed method, the first vehicle can rate the received maneuver information of the second vehicle. The surroundings information that is now available to the first vehicle allows the received maneuver information of the second vehicle to be interpreted, so that the first vehicle can associate a lane, for example, with the planned driving maneuver of the second vehicle. In this way, inaccuracies in the received position-related maneuver information can be identified by the first vehicle by means of the additionally available surroundings information, so that safety is significantly increased for the performance of a cooperative driving maneuver.

In the disclosed method, the second vehicle determines a driving maneuver to be carried out and transmits corresponding maneuver information pertaining to this driving maneuver. In addition to the maneuver information pertaining to the planned driving maneuver, the second vehicle transmits surroundings information pertaining to the peripheral area thereof. The second vehicle therefore allows the first vehicle to rate the maneuver information pertaining to the planned driving maneuver of the second vehicle on the basis of the additionally provided surroundings information. The risk of misinterpretation of the sent maneuver information can therefore be significantly reduced, which means that the risk of accident is reduced for the performance of a cooperative driving maneuver. The peripheral area of the second vehicle comprises a limited surrounding area of the second vehicle. Optionally, the peripheral area of the second vehicle is defined by means of a radius of surroundings of the second vehicle. By way of example, this radius of surroundings is in a range between 5 meters and 150 meters, more specifically in a range between 5 meters and 75 meters. Alternatively, the peripheral area of the second vehicle may be defined by means of the sensing range of the vehicle sensors of the second vehicle. By way of example, the peripheral area of the second vehicle is defined by the range of a radar sensor and/or of a camera of the second vehicle.

The surroundings information received by the first vehicle can comprise the surroundings information transmitted by the second vehicle pertaining to the peripheral area thereof. Optionally, the surroundings information pertaining to the peripheral area of the second vehicle is transmitted from the second vehicle to the first vehicle directly by means of vehicle-to-vehicle communication. In this way, a cooperative driving maneuver can be implemented even without the involvement of an infrastructure installation peripheral to the road. The second vehicle can have, by way of example, suitable vehicle sensors that permit surroundings information to be captured. Such vehicle sensors can comprise one or more cameras, one or more radar sensors and/or one or more lidar sensors. Alternatively or additionally, the second vehicle can likewise capture surroundings information by collating the available roadmap material with the current vehicle position. To this end, the second vehicle may comprise a device for position finding, such as a global navigation satellite system (GNSS). The roadmap material may, by way of example, be stored in a vehicle-internal memory or can be retrieved from a service, for instance, an online service.

The surroundings information transmitted by the second vehicle pertaining to the peripheral area of the second vehicle can comprise information pertaining to extraneous maneuvers that are performable by further vehicles in the peripheral area of the second vehicle, and/or information pertaining to driving maneuvers that are theoretically performable by the second vehicle but whose performance is not planned by the second vehicle. As a result of the first vehicle being notified that a right turn maneuver is performable in a first adjacent lane of the second vehicle and a left turn maneuver is performable in a second adjacent lane of the second vehicle, it is possible to infer that the second vehicle is in a middle lane of a section of road that has at least three lanes. It is therefore possible for a starting lane to be associated with the planned driving maneuver communicated by the maneuver information, so that planning certainty is significantly increased for the performance of a cooperative driving maneuver.

The information pertaining to extraneous maneuvers that are performable by further vehicles in the peripheral area of the second vehicle, and/or the information pertaining to driving maneuvers that are theoretically performable by the second vehicle but whose performance is not planned by the second vehicle, can respectively comprise multiple position data, the multiple position data each having an associated time value. The multiple position data and the time values associated with the respective position data can map one or more distance/time chains from which the first vehicle can derive a driving profile. Optionally, the multiple position data and the time values associated with the respective position data are digitally flagged such that the first vehicle can explicitly detect that information pertaining to extraneous maneuvers is involved. By way of example, flagging is effected by means of assignment of a flag value. The assignment of a flag value can be used to flag information pertaining to the planned driving maneuver of the second vehicle with a "1", for example, and information pertaining to extraneous maneuvers that are performable by further vehicles in the peripheral area of the second vehicle can be flagged with a "0". This allows explicit association of the received information.

The information pertaining to extraneous maneuvers that are performable by further vehicles in the peripheral area of the second vehicle may alternatively or additionally also comprise one or more polynomial functions, each polynomial function mapping an extraneous maneuver that is theoretically performable by a further vehicle in the peripheral area of the second vehicle. Polynomial functions allow for the selection of a suitable number of coefficients and of a suitable definition for these coefficients which allows an extremely broad spectrum of extraneous maneuvers to be mapped. On the basis of polynomial functions, extraneous maneuvers can moreover be mapped without interruption, which means that the extraneous maneuvers can be mapped with a high level of precision. Moreover, the use of polynomial functions allows the storage of chains of distance/time points to be dispensed with. The one or more polynomial functions may be second degree, third degree, fourth degree or fifth degree polynomial functions. The definition of the coefficients of a fifth degree polynomial function allows exact mapping of extraneous maneuvers that are theoretically performable by further vehicles in the peripheral area of the second vehicle.

Additionally, the surroundings information transmitted by the second vehicle pertaining to the peripheral area of the second vehicle can also comprise information pertaining to driving maneuvers that are theoretically performable by the second vehicle but whose performance is not planned by the second vehicle. Analogously to the information pertaining to the extraneous maneuvers, the information pertaining to driving maneuvers that are theoretically performable by the second vehicle but whose performance is not planned by the second vehicle can comprise multiple position data and/or one or more polynomial functions.

The surroundings information received by the first vehicle can comprise surroundings information transmitted by an infrastructure installation pertaining to a traffic area. The surroundings information pertaining to a traffic area can comprise the arrangement and position of lane or road markings in the traffic area. Optionally, the surroundings information pertaining to the traffic area is stored in a memory of the infrastructure installation. Alternatively or additionally, the infrastructure installation can have one or more cameras whose recordings are evaluated by means of an evaluation routine to regularly capture surroundings information pertaining to the traffic area. The infrastructure installation may be an intelligent roadside station (IRS) and comprise a communication module, wherein the communication module is set up to communicate wirelessly with the vehicles within the traffic area by means of vehicle-to-infrastructure communication. The infrastructure installation may moreover be set up to check the availability of the lanes arranged within the traffic area. This allows the vehicles within the traffic area to be provided with additional information that can significantly reduce the risk of accident for the performance of a cooperative driving maneuver.

The surroundings information pertaining to a traffic area can be sent by the infrastructure installation in a standardized data format and/or by means of a standardized communication routine. By way of example, the surroundings information pertaining to a traffic area may be sent as an SAE (Society of Automotive Engineers) J2735 message. The surroundings information pertaining to a traffic area is sent using the "MSG_MapData" message defined in the SAE J2735 standard.

The surroundings information transmitted by the second vehicle pertaining to the peripheral area of the second vehicle and/or the surroundings information transmitted by the infrastructure installation pertaining to the traffic area can comprise lane information. By way of example, the vehicles within the traffic area can be notified that one or more lanes are blocked in sections or completely and hence are unavailable for the performance of a cooperative driving maneuver. Lanes can be blocked by parked vehicles or by temporary roadworks, for example.

The lane information can comprise the number of lanes in the traffic area and/or in the peripheral area of the second vehicle. The traffic area may also be divided into multiple sectors, for example, individual sectors have associated limited sections of a junction area. In this way, a number of lanes can be associated with the individual sectors. This is beneficial in the case of junctions at which a highly frequented multilane road having a plurality of lanes crosses a less frequented road having a smaller number of lanes. Alternatively or additionally, the lane information can comprise the profile of the lanes in the traffic area. The profile can be mapped, by way of example, using one or more groups of waypoints, each group of waypoints being associated with a lane and comprising a plurality of geographical waypoints along the lane profile. Moreover, the lane information can comprise the association of the second vehicle with a lane. An explicit association of the second vehicle with a lane allows erroneous or imprecise position-related maneuver information of the second vehicle to be reliably identified. This prevents the first vehicle from setting out from misinformation concerning the current position of the second vehicle when performing the planned driving maneuver. This further increases safety for the performance of cooperative driving maneuvers.

The lane information can comprise one or more polynomial functions, each polynomial function mapping a lane profile. Polynomial functions allow for selection of a suitable number of coefficients and of a suitable definition for these coefficients which allows an extremely broad spectrum of lane profiles to be mapped. On the basis of polynomial functions, lane profiles can moreover be mapped without interruption, so that the lane profiles can be mapped with a high level of precision. Moreover, the use of polynomial functions allows the storage of chains of distance/time points to be dispensed with. The one or more polynomial functions may be second degree, third degree, fourth degree or fifth degree polynomial functions. The definition of the coefficients of a fifth degree polynomial function allows exact mapping of lane profiles.

The maneuver information pertaining to the driving maneuver of the second vehicle can comprise multiple position data, the multiple position data each having an associated time value. The multiple position data can comprise data pertaining to equidistantly spaced positions. By way of example, the position data comprise data pertaining to positions, wherein two respective positions are at a distance of 5 centimeters, 10 centimeters, 25 centimeters or 50 centimeters from one another. Alternatively, the intervals of time between the time values associated with the position data may be equidistant. By way of example, there is 0.1 second, 0.25 second, 0.5 second or 1 second between each of the respective time values that are associated with the position data. Alternatively, the spacing of the individual positions and/or the time offset between the time values associated with the individual position data may be different.

The multiple position data and the time values of the maneuver information pertaining to the driving maneuver of the second vehicle that are associated with the position data can map a distance/time profile of the driving maneuver to be carried out by the second vehicle. From the distance/time profile, the first vehicle can derive the planned route of the second vehicle. The distance/time profile provided moreover allows the first vehicle to draw conclusions about the speed, the acceleration or the selected steering angle of the second vehicle and to take these into consideration when performing the cooperative driving maneuver.

The maneuver information pertaining to the driving maneuver of the second vehicle can comprise multiple speed data, acceleration data and/or steering angle data that each have an associated time value and that map the driving maneuver to be carried out by the second vehicle. As a result of the first vehicle being provided with further maneuver-specific data in addition or as an alternative to the position data, the first vehicle can detect the driving maneuver planned by the second vehicle even more precisely, as a result of which the risk of accident is further reduced for the performance of a cooperative driving maneuver.

The maneuver information pertaining to the driving maneuver of the second vehicle can comprise a polynomial function that maps the driving maneuver to be carried out by the second vehicle. The mapping of the driving maneuver to be carried out by the second vehicle using a polynomial function allow for selection of a suitable number of coefficients and of a suitable definition for these coefficients which allows an extremely broad spectrum of driving profiles to be mapped. On the basis of a polynomial function, a driving profile can moreover be mapped without interruption, so that the driving maneuver of the second vehicle can be mapped with a high level of precision. Moreover, the use of a polynomial function allows the formation of a chain of distance/time points to be dispensed with. The one polynomial function may be a second degree, third degree, fourth degree or fifth degree polynomial function. The definition of the coefficients of a fifth degree polynomial function allows exact mapping of driving profiles.

The disclosed vehicle comprises a computation unit for determining a driving maneuver to be carried out and a communication device that is set up to receive maneuver information of other vehicles and surroundings information and/or to transmit maneuver information pertaining to the driving maneuver to be carried out and surroundings information pertaining to the peripheral area of the vehicle. The computation unit may be set up to stipulate a maneuver trajectory for the driving maneuver to be carried out on the basis of the received maneuver information and the received surroundings information and to prompt performance of the driving maneuver using the stipulated maneuver trajectory. The same modifications as described above apply.

The vehicle may moreover be set up to carry out the method for performing a cooperative driving maneuver that is described above.

The various embodiments that are specified in this application are combinable with one another, unless stated otherwise for individual cases.

FIG. 1 shows a traffic area in which two roads cross. The two roads each have three lanes, two lanes in each case being set up for driving along in a first direction and one lane in each case being set up for driving along in a second direction. At the road junction, there are two vehicles 10, 16.

The first vehicle 10 has a computation unit 12 and a communication device 14. The computation unit 12 is set up to determine a driving maneuver to be carried out. The communication device 14 is set up to receive maneuver information of other vehicles and surroundings information. In the depicted situation, the first vehicle 10 receives maneuver information pertaining to the planned driving maneuver of the second vehicle 16. Moreover, the first vehicle 10 receives surroundings information. On the one hand, the first vehicle 10 receives surroundings information pertaining to the peripheral area of the second vehicle 16 directly from the second vehicle 16, and on the other hand, the first vehicle 10 receives surroundings information pertaining to the traffic area from an infrastructure installation 22.

The driving maneuver to be carried out is determined by means of the definition of multiple position data, the position data each having an associated time value. The position data and the time values associated with the position data map a distance/time profile 24 that takes into consideration the received maneuver information of the second vehicle 16 and the surroundings information pertaining to the peripheral area of the second vehicle 16. The computation unit 12 of the first vehicle 10 is set up to stipulate a maneuver trajectory for the driving maneuver to be carried out on the basis of the maneuver information received from the second vehicle 16 and the surroundings information received from the second vehicle 16 and the infrastructure installation 22 and to prompt the performance of the driving maneuver using the stipulated maneuver trajectory.

The second vehicle 16 likewise has a computation unit 18 and a communication device 20. The computation unit 18 is set up to determine a driving maneuver to be carried out. The communication device 20 is set up to transmit maneuver information pertaining to the driving maneuver to be carried out and surroundings information pertaining to the peripheral area of the second vehicle 16 to other vehicles, in the present case to the first vehicle 10, and to infrastructure units, in the present case to the infrastructure unit 22. The driving maneuver to be carried out is also determined for the second vehicle 16 by means of the definition of multiple position data, the position data each having an associated time value. The position data and the time values associated with the position data map a distance/time profile 26.

The surroundings information pertaining to the peripheral area of the second vehicle 16 that is sent from the second vehicle 16 to the first vehicle 10 comprises information pertaining to extraneous maneuvers that are theoretically performable by further vehicles in the peripheral area of the second vehicle 16. Moreover, the surroundings information pertaining to the peripheral area of the second vehicle 16 that is sent from the second vehicle 16 to the first vehicle 10 comprises information pertaining to driving maneuvers that are theoretically performable by the second vehicle 16 but whose performance is not planned by the second vehicle 16. The information pertaining to extraneous maneuvers that are theoretically performable by further vehicles in the peripheral area of the second vehicle 16 comprises multiple position data, the multiple position data each having an associated time value, so that the distance/time profiles 28, 30 are mapped.

The surroundings information transmitted by the second vehicle 16 pertaining to the peripheral area of the second vehicle 16 comprises lane information, namely the number of lanes in the immediate surroundings of the second vehicle 16 and the association of the second vehicle 16 with a lane.

The surroundings information pertaining to the traffic area that is sent from the infrastructure installation 22 to the first vehicle 10 likewise comprises lane information, namely the number and profile of the lanes in the traffic area of the junction.

Otherwise, the first vehicle 10 is set up to carry out the method for performing a cooperative driving maneuver according to one of claims 1 to 13. The second vehicle 16 is set up to carry out the method for performing a cooperative driving maneuver according to one of claims 2 to 13.

Figure 2:
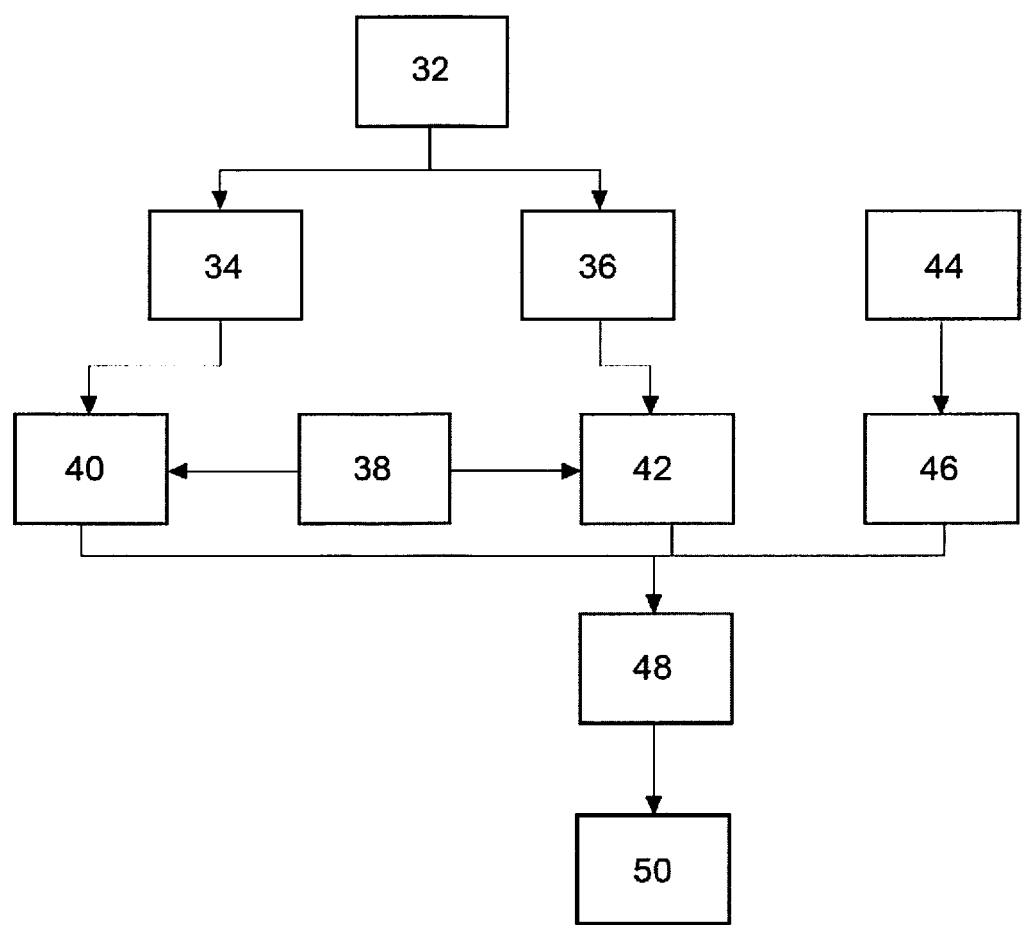
FIG. 2 shows an exemplary embodiment of the disclosed method for performing a cooperative driving maneuver.

FIG. 2 shows an exemplary embodiment of the disclosed method for performing a cooperative driving maneuver. The performance of the cooperative driving maneuver involves a first vehicle 10 and a second vehicle 16. First of all, the second vehicle 16 uses the following operation to stipulate an example of a driving maneuver to be carried out:

32) Determination, by the second vehicle 16, of a left turn maneuver to be carried out.

After the driving maneuver to be carried out has been selected by the second vehicle 16, it is now possible for other vehicles to be provided with information pertaining to this driving maneuver, namely by the following operation:

34) Transmission, by the second vehicle 16, of maneuver information pertaining to the left turn maneuver to be carried out.

The maneuver information pertaining to the left turn maneuver of the second vehicle 16 comprises multiple position data, the multiple position data each having an associated time value. The multiple position data and the time values associated with the multiple position data of the maneuver information pertaining to the left turn maneuver of the second vehicle 16 map a distance/time profile 26. The distance/time profile 26 corresponds to the planned path of travel of the second vehicle 16, each waypoint having an associated time of day or other time value. Additionally, the maneuver information pertaining to the left turn maneuver of the second vehicle 16 comprises multiple speed data, acceleration data and steering angle data that each likewise have an associated time value. The multiple speed data, acceleration data and steering angle data and the time values associated with these data likewise map the left turn maneuver planned by the second vehicle 16.

Besides the maneuver information pertaining to the planned left turn maneuver, the second vehicle 16 provides the vehicles or infrastructure installations 22 in the surroundings with yet further traffic-relevant information, however. To this end, the following operation is carried out:

36) Transmission, by the second vehicle 16, of surroundings information pertaining to the peripheral area of the second vehicle 16.

The surroundings information transmitted by the second vehicle 16 pertaining to the peripheral area of the second vehicle 16 comprises lane information, the lane information comprising the number and profile of the lanes in the peripheral area of the second vehicle 16 and the association of the second vehicle 16 with a lane.

Moreover, the surroundings information transmitted by the second vehicle 16 pertaining to the peripheral area of the second vehicle 16 comprises information pertaining to extraneous maneuvers that are performable by further vehicles in the peripheral area of the second vehicle 16. The information pertaining to extraneous maneuvers that are performable by further vehicles in the peripheral area of the second vehicle 16 likewise comprises multiple position data, the multiple position data each having an associated time value. The multiple position data and the time values associated with the multiple position data of the information pertaining to extraneous maneuvers map multiple distance/time profiles 28, 30. The distance/time profiles 28, 30 correspond to fictitious driving maneuvers that would be theoretically performable by other vehicles in the peripheral area of the second vehicle 16.

So that a cooperative driving maneuver can be performed, the first vehicle 10 also uses the following operation to stipulate a driving maneuver to be carried out:

38) Determination, by the first vehicle 10, of a left turn maneuver to be carried out.

After the driving maneuver to be carried out has been stipulated, it is now possible to check whether other vehicles that are in the surroundings of the first vehicle 10 have planned to carry out driving maneuvers that collide. To this end, the following operation is carried out:

40) Reception, by the first vehicle 10, of maneuver information pertaining to a planned driving maneuver of the second vehicle 16.

The maneuver information received by the first vehicle 10 comprises the maneuver information transmitted by the second vehicle 16 pertaining to the planned left turn maneuver of the second vehicle 16. On the basis of the received maneuver information, the first vehicle 10 can take into consideration the planned path of travel of the second vehicle 16 for the performance of its own left turn maneuver.

When performing its own left turn maneuver on the basis of the information that is now available to the first vehicle 10, the first vehicle 10 cannot check the correctness or accuracy of the received data, for instance, of the received position data, however. Should the second vehicle 16 have sent erroneous and/or inaccurate position data, therefore, the first vehicle 10 would base the planning of the left turn maneuver on erroneous information pertaining to the traffic scenario to be expected while the driving maneuver is carried out. This would present a substantial risk of accident. To be able to check the maneuver information received from the second vehicle 16 for correctness and accuracy and if need be for plausibility, the following operation is carried out:

42) Reception, by the first vehicle 10, of the surroundings information pertaining to the peripheral area of the second vehicle 16.

The surroundings information received by the first vehicle 10 comprises the surroundings information transmitted by the second vehicle 16 pertaining to the peripheral area thereof. Since the first vehicle 10 now has more detailed information available pertaining to the peripheral area of the second vehicle 16, the received maneuver information can be checked by the first vehicle 10.

Moreover, the first vehicle 10 can check the data received from the second vehicle 16 by using further surroundings information pertaining to a relevant traffic area that is provided by infrastructure installations 22 peripheral to the road. In the present case, the relevant traffic area is the road junction at which the first vehicle 10 and the second vehicle 16 each plan the performance of their left turn maneuvers. In this regard, the method comprises the following operation:

44) Transmission of surroundings information pertaining to the road junction by an intelligent roadside station 22.

The surroundings information transmitted by the intelligent roadside station 22 pertaining to the road junction likewise comprises lane information, the lane information comprising the number and profile of the lanes in the traffic area. So that the first vehicle 10 can take into consideration the information transmitted by the intelligent roadside station 22, the following operation is carried out:

46) Reception of the surroundings information pertaining to the traffic area by the first vehicle 10.

The first vehicle 10 now has maneuver information available pertaining to the planned driving maneuver of the second vehicle 16, surroundings information available pertaining to the peripheral area of the second vehicle 16 and surroundings information available pertaining to the relevant traffic area, so that the following operation can be carried out:

48) Stipulation, by the first vehicle 10 on the basis of the received maneuver information and received surroundings information, of a maneuver trajectory for the driving maneuver to be carried out.

On the basis of the large amount of different information, the risk of accident is minimized for the performance of the planned driving maneuver by the first vehicle 10, so that the following operation can be carried out:

50) Performance of the driving maneuver by the first vehicle 10 using the stipulated maneuver trajectory.

As a result of the additionally available surroundings information, the disclosed embodiment provides a way of being better able to interpret planned driving maneuvers of other vehicles. This significantly increases safety for the performance of a cooperative driving maneuver.

LIST OF REFERENCE SYMBOLS

10 First vehicle
12 Computation unit
14 Communication device
16 Second vehicle
18 Computation unit
20 Communication device
22 Infrastructure installation
24 Distance/time profile
26 Distance/time profile
28 Distance/time profile
30 Distance/time profile
32-50 Method operations

The invention claimed is:

1. A method for performing a cooperative driving maneuver, the method comprising:
   determining, by a first vehicle, a driving maneuver to be carried out by the first vehicle;
   determining, by a second vehicle, a driving maneuver to be carried out by the second vehicle;
   transmitting, by the second vehicle, maneuver information pertaining to a planned driving maneuver to be carried out by the second vehicle;
   receiving the maneuver information by the first vehicle;
   transmitting surroundings information pertaining to a peripheral area of the second vehicle from the second vehicle, the surroundings information including information pertaining to driving maneuvers that are theoretically performable by the second vehicle but whose performance is not planned by the second vehicle;
   receiving the surroundings information by the first vehicle;
   stipulating, by the first vehicle based on the received maneuver information and the received surroundings information, a maneuver trajectory for the driving maneuver to be carried out by the first vehicle; and
   performing the driving maneuver by the first vehicle using the stipulated maneuver trajectory.

2. The method of claim 1, wherein the surroundings information transmitted by the second vehicle pertaining to the peripheral area of the second vehicle further comprises information pertaining to extraneous maneuvers that are performable by further vehicles in the peripheral area of the second vehicle.

3. The method of claim 2, wherein the information pertaining to extraneous maneuvers that are performable by further vehicles in the peripheral area of the second vehicle, and/or the information pertaining to driving maneuvers that are theoretically performable by the second vehicle but whose performance is not planned by the second vehicle, respectively comprises multiple position data, the multiple position data each having their own associated time value.

4. The method of claim 1, further comprising receiving surroundings information by the first vehicle transmitted by an infrastructure installation pertaining to a traffic area.

5. The method of claim 4, wherein the surroundings information transmitted by the second vehicle pertaining to the peripheral area of the second vehicle and/or the surroundings information transmitted by the infrastructure installation pertaining to the traffic area further comprises lane information.

6. The method of claim 5, wherein the lane information comprises the number and/or profile of the lanes in the traffic area and/or in the peripheral area of the second vehicle and/or comprises the association of the second vehicle with a lane.

7. The method of claim 5, wherein the lane information comprises one or more polynomial functions, each polynomial function mapping a lane profile.

8. The method of claim 1, wherein the maneuver information pertaining to the driving maneuver of the second vehicle comprises multiple position data, the multiple position data each having an associated time value.

9. The method of claim 8, wherein the multiple position data and the time values of the maneuver information pertaining to the driving maneuver of the second vehicle that are associated with the multiple position data map a distance/time profile of the driving maneuver to be carried out by the second vehicle.

10. The method of claim 1, wherein the maneuver information pertaining to the driving maneuver of the second vehicle comprises multiple speed data, acceleration data and/or steering angle data that each have an associated time value and that map the driving maneuver to be carried out by the second vehicle.

11. The method of claim 1, wherein the maneuver information pertaining to the driving maneuver of the second vehicle comprises a polynomial function that maps the driving maneuver of the second vehicle that is to be carried out.

12. A first vehicle comprising:
a computation unit for determining a driving maneuver to be carried out by the first vehicle;
a communication device set up to receive maneuver information of vehicles other than the first vehicle and surroundings information and/or to transmit maneuver information pertaining to the driving maneuver to be carried out by the first vehicle and surroundings information pertaining to a peripheral area of the first vehicle,
wherein the communication device receives maneuver information pertaining to a planned driving maneuver of a second vehicle from the second vehicle and receives surroundings information pertaining to a peripheral area of the second vehicle from the second vehicle including information pertaining to driving maneuvers that are theoretically performable by the second vehicle but whose performance is not planned by the second vehicle, the computation unit stipulates a maneuver trajectory for the driving maneuver to be carried out by the first vehicle based on the received maneuver information and the received surroundings information and the computation unit is configured to prompt performance of the driving maneuver by the first vehicle using the stipulated maneuver trajectory.

13. The first vehicle of claim 12, wherein the surroundings information further comprises information pertaining to extraneous maneuvers that are performable by further vehicles in the peripheral area of the second vehicle.

14. The first vehicle of claim 13, wherein the information pertaining to extraneous maneuvers that are performable by further vehicles in the peripheral area of the second vehicle, and/or the information pertaining to driving maneuvers that are theoretically performable by the second vehicle but whose performance is not planned by the second vehicle, respectively comprises multiple position data, the multiple position data each having their own associated time value.

15. The first vehicle of claim 12, further comprising receiving surroundings information by the first vehicle transmitted by an infrastructure installation pertaining to a traffic area.

16. The first vehicle of claim 15, wherein the surroundings information further comprises lane information.

17. The first vehicle of claim 16, wherein the lane information comprises the number and/or profile of the lanes in the traffic area and/or in the peripheral area of the second vehicle and/or comprises the association of the second vehicle with a lane.

18. The first vehicle of claim 16, wherein the lane information comprises one or more polynomial functions, each polynomial function mapping a lane profile.

19. The first vehicle of claim 12, wherein the maneuver information pertaining to the driving maneuver of the second vehicle comprises multiple position data, the multiple position data each having an associated time value.

20. The first vehicle of claim 19, wherein the multiple position data and the time values of the maneuver information pertaining to the driving maneuver of the second vehicle that are associated with the multiple position data map a distance/time profile of the driving maneuver to be carried out by the second vehicle.

21. The first vehicle of claim 12, wherein the maneuver information pertaining to the driving maneuver of the second vehicle comprises multiple speed data, acceleration data and/or steering angle data that each have an associated time value and that map the driving maneuver to be carried out by the second vehicle.

22. The first vehicle of claim 12, wherein the maneuver information pertaining to the driving maneuver of the second vehicle comprises a polynomial function that maps the driving maneuver of the second vehicle that is to be carried out.

* * * * *